July 19, 1927.
J. W. COATES
TRUCK
Filed Oct. 5, 1925
1,636,172
2 Sheets-Sheet 1
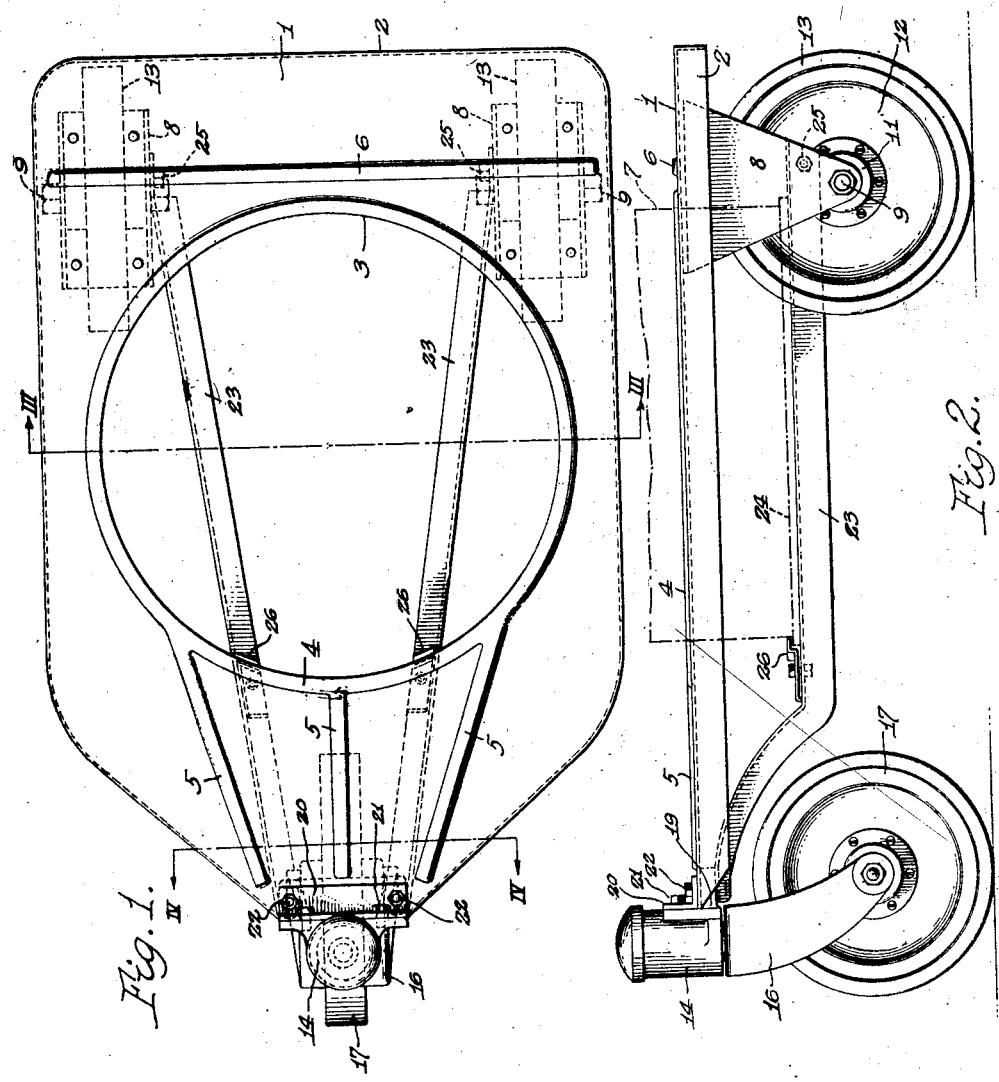
Inventor
John W. Coates,
By
Attorneys July 19, 1927.
J. W. COATES
TRUCK
Filed Oct. 5, 1925
1,636,172
2 Sheets-Sheet 2
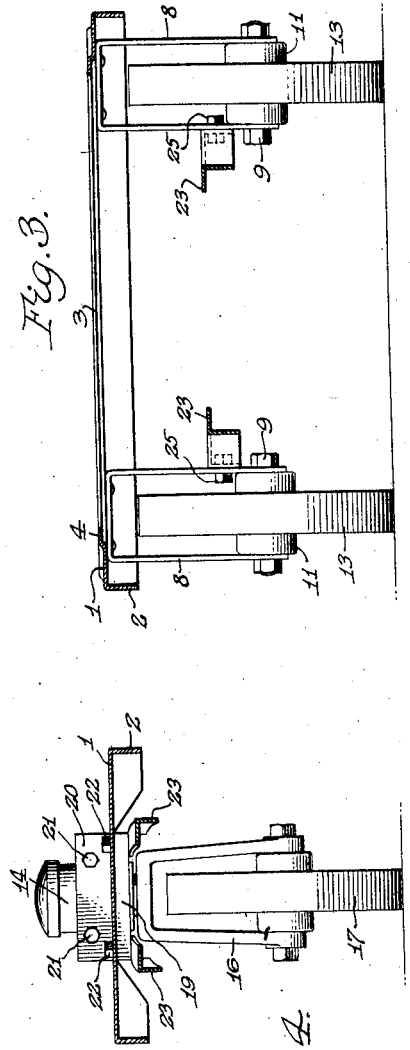
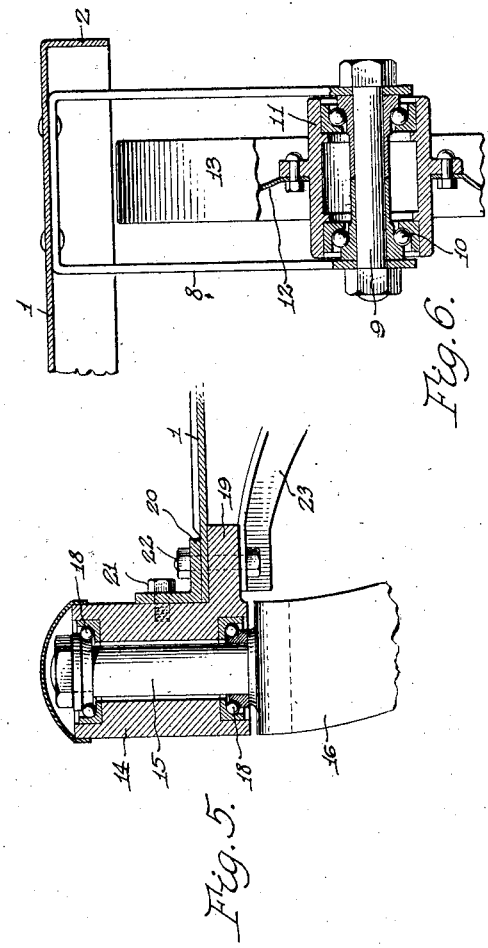
Inventor
John W. Coates, Patented July 19, 1927.

1,636,172

UNITED STATES PATENT OFFICE.

JOHN W. COATES, OF DETROIT, MICHIGAN.

TRUCK.

Application filed October 5, 1925. Serial No. 60,470.

This invention relates to trucks that may be advantageously used for industrial purposes where oil tanks, vats or other large and heavy receptacles are adapted to be moved about.

My invention aims to provide a three wheel truck in which a tank or other receptacle may be placed and safely moved about without any danger of the tank shifting relative to the truck or becoming accidentally displaced.

My invention further aims to provide a strong, durable and comparatively inexpensive industrial truck having underslung supports for a tank or other receptacle relative to the body of the truck which serves as retaining means for preventing displacement of the tank relative to the supports. The body of the truck serves as a platfrom and in some instances facilitates access being had to the upper end of the tank by reason of the lower end thereof being supported below the body or platform of the truck. Again, the body or platform permits of the truck being used for other purposes, about an industrial plant, in addition to that of conveying tanks or like receptacles.

My truck is made from metal and the configuration and construction of the truck will be hereinafter specifically described and then claimed.

Reference will now be had to the drawings, wherein—

Figure 1 is a plan of the truck;

Fig. 2 is a side elevation of the same showing by dot and dash lines a portion of a tank or receptacle supported by the truck;

Fig. 3 is a cross sectional view taken on the line III—III of Fig. 1;

Fig. 4 is a similar view taken on the line IV—IV of Fig. 1;

Fig. 5 is a detail sectional view of the front end bearing, and

Fig. 6 is a detail sectional view of a portion of one of the rear wheels of the truck.

The truck comprises a comparatively flat body or platform 1 which is substantially rectangular in plan with the exception of the front end of the body which has a tapered portion adapted to be attached to a front end bearing. The body is formed with a depending stiffening flange 2 and centrally of the body is a large opening 3 with the material forming the marginal edges of the opening braced to provide a stiffening flange 4 from which may extend a plurality of pressed out stiffening ribs 5. Another stiffening rib 6 may extend transversely of the body adjacent to the rear end thereof and with the body cut, stamped or pressed from sheet metal the flange 4 and the ribs 5 and 6 may be easily formed so as to add strength and rigidity to the sheet metal body or platform 1. The opening 3 has been shown as circular to accommodate a cylindrical tank 7, but it is obvious that this opening may be of such shape as to receive receptacles of various configurations.

Depending from the lower face of the body 1, adjacent the rear end thereof, are inverted U-shaped wheel bearings 8 which may have the upper ends thereof riveted or otherwise connected to the body 1, as best shown in Fig. 6. Each wheel bearing is provided with a nut equipped bolt 9 and encircling said bolt are anti-frictional ball bearings 10 of a conventional form including inner and outer race members with balls or rollers interposed therebetween.

Mounted on the anti-frictional bearings 10 is the hub 11 of a fixed wheel 12 having a tire 13, and this wheel has been made the subject matter of another application. The wheels 12 afford ample support for the rear end of the body or platform, and a single steering wheel or caster is used at the front narrow end of the truck body.

The reference numeral 14 denotes a front end bearing or post which is tubular and adapted to receive the pivot pin 15 of a front wheel bearing 16 supported by a wheel 17 similar to the wheels 12. The bearing 16 is curved rearwardly in order that the greater part of the wheel 17 may be under the truck, and anti-frictional ball or roller bearings 18 are interposed between the pivot pin 15 and the bearing or post 14, so that the forward end of the truck may be safely sustained by the front wheel 17.

On the rear side of the front end bearing or post 14 is a bracket or ledge 19 on to which extends the tapered front end of the body 1, said body having the flange 2 thereof cut away to provide clearance for the bracket. The metal body is retained on the bracket 19 by an angle plate 20 secured to the front end bearing by screw bolts 21 and to the bracket 19 by nut equipped bolts 22.

The reference numerals 23 denote converging supports preferably made of angle bars with flanges thereof horizontally disposed for supporting the bottom or chimes 24 of the tank or receptacle 7. The rear ends of the supports 23 have the side flanges thereof connected to the rear wheel bearings 8 by nut equipped bolts 25 and the front ends of said supports are bent upwardly for engagement under the bracket 19 so that the front ends of said supports may be attached to the bracket by the nut equipped bolts 22. The supports 23 are at the sides of the vertical axis of the opening 3, and some distance below the opening so that when the tank 7 is placed on the supports 23 the flange 4 will brace the tank and prevent accidental tilting or displacement relative to the truck.

In some instances it may be desirable to anchor the tank 7 relative to the supports 23, therefore, one or more pivoted overhanging cleats or clips 26 may be mounted on the supports 23 to engage the chime 24 of the tank 7.

From the foregoing it will be observed that my truck provides a substantial mounting for a tank that is prevented from tipping over by the tank support being underslung and in a plane below the top of the truck, the load being supported by the wheel brackets. The load is in a downward direction and might have a tendency to upwardly buckle the body or platform, but this body or platform is stiffened and braced by its flanges and ribs and affords a rigid truss between the front and rear ends of the tank supports. It is obvious that the sides of such a tank will be protected by being inset from the side edges of the truck body and consequently the truck will withstand rough usage and may be easily moved about. Again, it is obvious that the truck body may be supported by more than three wheels, for instance two swiveled wheels or casters at the front end of the truck and such an arrangement will positively eliminate any danger of the truck tilting. In the general make-up of the truck the parts are constructed with a view of reducing the cost of manufacture by using structural shapes easy to produce and assemble.

I would have it understood that the structural elements are susceptible to such variations and modifications as are permissible by the appended claims.

What I claim is:—

1. A truck of the type described comprising a wheel equipped front-end bearing, a bracket carried thereby, a platform body having its forward end attached to the upper face of said bracket, said platform body having a comparatively large tank receiving opening, supports in a plane below said body adapted to support a tank in the body opening, said supports having the forward ends thereof attached to the lower face of said bracket, and wheels supporting the rear end of said body and the rear ends of said supports.

2. A truck of the type described comprising a platform body having a comparatively large tank receiving opening, supporting strips in a plane below said body adapted to support a tank in the body opening and diverging towards one end of the truck, a single wheel supporting the converged ends, and a pair of wheels supporting the diverged ends of said strips.

3. A truck of the type described comprising a platform body having a tank receiving opening, said platform body being pressed from metal and formed with stiffening ribs and flanges, rear end bearings attached to said body, rear wheels in said bearings, a front end bearing attached to said body, a wheel pivotally supporting said bearing, and tank supports in a plane below the opening of said body and connecting said rear end bearings to said front end bearing.

4. A set of rear wheels, a single front swivel wheel, a platform of greater width than the rear set of wheels and supported in a plane above all of said wheels, said platform having an opening, and supports converging from the rear wheels to the front wheel, said supports being in a plane between said platform and a plane passing through the axes of all of said wheels.

In testimony whereof I affix my signature.

JOHN W. COATES.